US012591549B2

(12) United States Patent
Zhang et al.

(10) Patent No.: US 12,591,549 B2
(45) Date of Patent: Mar. 31, 2026

(54) METHOD, APPARATUS, ELECTRONIC DEVICE AND STORAGE MEDIUM FOR DATA PROCESSING

(71) Applicant: Beijing Zitiao Network Technology Co., Ltd., Beijing (CN)

(72) Inventors: Wei Zhang, Beijing (CN); Qingfeng Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 10 days.

(21) Appl. No.: 18/631,947

(22) Filed: Apr. 10, 2024

(65) Prior Publication Data

US 2024/0256495 A1     Aug. 1, 2024

(30) Foreign Application Priority Data

Apr. 10, 2023     (CN) .......................... 202310378023.5

(51) Int. Cl.
*G06F 16/182*          (2019.01)
*G06F 16/16*           (2019.01)

(52) U.S. Cl.
CPC ........ *G06F 16/1824* (2019.01); *G06F 16/164* (2019.01)

(58) Field of Classification Search
CPC ........................... G06F 16/182; G06F 16/1824
USPC ........................................................ 707/827
See application file for complete search history.

(56) References Cited

U.S. PATENT DOCUMENTS

| | | | | |
|---|---|---|---|---|
| 9,424,135 B1 * | 8/2016 | Carpenter | ............. | G06F 16/113 |
| 2023/0018232 A1 * | 1/2023 | Picciallo | ............... | G16H 20/10 |

FOREIGN PATENT DOCUMENTS

| | | |
|---|---|---|
| CN | 108133155 A | 6/2018 |
| CN | 108563697 A | 9/2018 |
| CN | 108595989 A | 9/2018 |
| CN | 109284622 A | 1/2019 |
| CN | 110347675 A | 10/2019 |
| CN | 110764700 A | 2/2020 |
| CN | 111201519 A | 5/2020 |
| CN | 115204158 A | 10/2022 |
| CN | 115481089 A | 12/2022 |

OTHER PUBLICATIONS

Office Action for Chinese Patent Application No. 202310378023.5, mailed on Jul. 21, 2025, 22 pages.

* cited by examiner

*Primary Examiner* — Tony Mahmoudi
(74) *Attorney, Agent, or Firm* — Astute IP Law Group

(57) ABSTRACT

The disclosure provides a method, apparatus, electronic device and storage medium for data processing. The method includes: obtaining a storage request for target data; obtaining first dimension information and second dimension information of the target data based on the storage request, the first dimension information representing information of a user to which the target data belongs, and the second dimension information representing information of a business to which the target data belongs; and storing the target data into the first storage region.

16 Claims, 4 Drawing Sheets

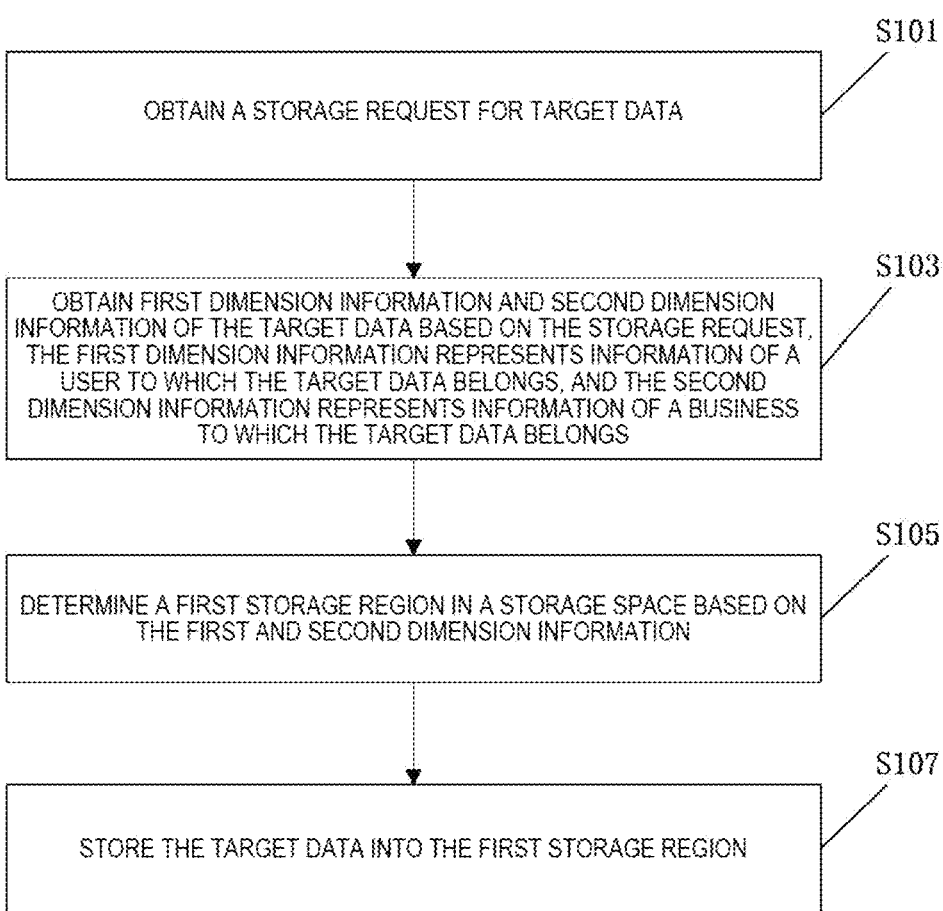

S101

OBTAIN A STORAGE REQUEST FOR TARGET DATA

S103

OBTAIN FIRST DIMENSION INFORMATION AND SECOND DIMENSION INFORMATION OF THE TARGET DATA BASED ON THE STORAGE REQUEST, THE FIRST DIMENSION INFORMATION REPRESENTS INFORMATION OF A USER TO WHICH THE TARGET DATA BELONGS, AND THE SECOND DIMENSION INFORMATION REPRESENTS INFORMATION OF A BUSINESS TO WHICH THE TARGET DATA BELONGS

S105

DETERMINE A FIRST STORAGE REGION IN A STORAGE SPACE BASED ON THE FIRST AND SECOND DIMENSION INFORMATION

S107

STORE THE TARGET DATA INTO THE FIRST STORAGE REGION

FIG. 1

METHOD, APPARATUS, ELECTRONIC DEVICE AND STORAGE MEDIUM FOR DATA PROCESSING

CROSS-REFERENCE TO RELATED APPLICATIONS

The present application claims priority to Chinese Patent Application No. 202310378023.5, filed on Apr. 10, 2023 and entitled "METHOD, APPARATUS, ELECTRONIC DEVICE AND STORAGE MEDIUM FOR DATA PROCESSING", the entirety of which is incorporated herein by reference.

FIELD

The present disclosure relates to the field of data processing, and in particular, to a method, apparatus, electronic device and storage medium for data processing.

BACKGROUND

At present, some application software integrates a plurality of components with different functions. The interfaces of these components are scattered, lacking unified specifications and functional abstractions, and difficult to control. Many problems such as crossed-data user, crossed-data business, may arise when the data obtained after processing by the components are stored.

SUMMARY

In view of this, the purpose of the present disclosure is to provide a method, apparatus, electronic device and storage medium for data processing.

Based on the above purpose, the first aspect of the present disclosure provides a method for data processing, comprising:

obtaining a storage request for target data;

obtaining first dimension information and second dimension information of the target data based on the storage request, the first dimension information representing information of a user to which the target data belongs, and the second dimension information representing information of a business to which the target data belongs;

determining a first storage region in a storage space based on the first and second dimension information; and storing the target data into the first storage region.

A second aspect of the present disclosure provides an apparatus for data processing, comprising:

a first obtaining module configured to obtain storage requests for target data;

a second obtaining module configured to obtain first dimension information and second dimension information of the target data based on the storage request, wherein the first dimension information represents information of a user to which the target data belongs, and the second dimension information represents information of a business to which the target data belongs;

a determination module configured to determine a first storage region in the storage space based on the first and second dimension information; and a storage module configured to: store the target data into the first storage region.

A third aspect of the present disclosure provides an electronic device, including a memory, a processor, and a computer program stored in the memory and executable on the processor. When the processor executes the program, implements the method for data processing as described in the first aspect.

A fourth aspect of the present disclosure provides a non-transitory computer-readable storage medium storing computer instructions for causing the computer to perform the method for data processing as described in the first aspect.

It can be seen from the above that with the method, apparatus, electronic device and storage medium for processing data provided by the present disclosure, a first storage region is determined from the storage space based on first dimension information and second dimension information of the target data. That is, the first storage region is determined based on both the user and the business to which the target data belongs. The target data is stored into the first storage region, which is performed independently and is implemented in the first storage region isolated from other storage regions. Therefore, the isolation of data storage is assured, and the problems of crossed-data user and crossed-data business are solved.

BRIEF DESCRIPTION OF THE DRAWINGS

In order to explain the technical solutions in the present disclosure or related technologies more clearly, the drawings needed to be used in the description of embodiments or related technologies will be briefly introduced below. Obviously, the drawings in the following description are only the embodiments of the present disclosure. For those of ordinary skill in the art, other drawings can also be obtained based on these drawings without exerting creative efforts.

FIG. 1 shows a schematic flow chart of an exemplary method provided by embodiments of the present disclosure;

DETAILED DESCRIPTION

Figure 2:
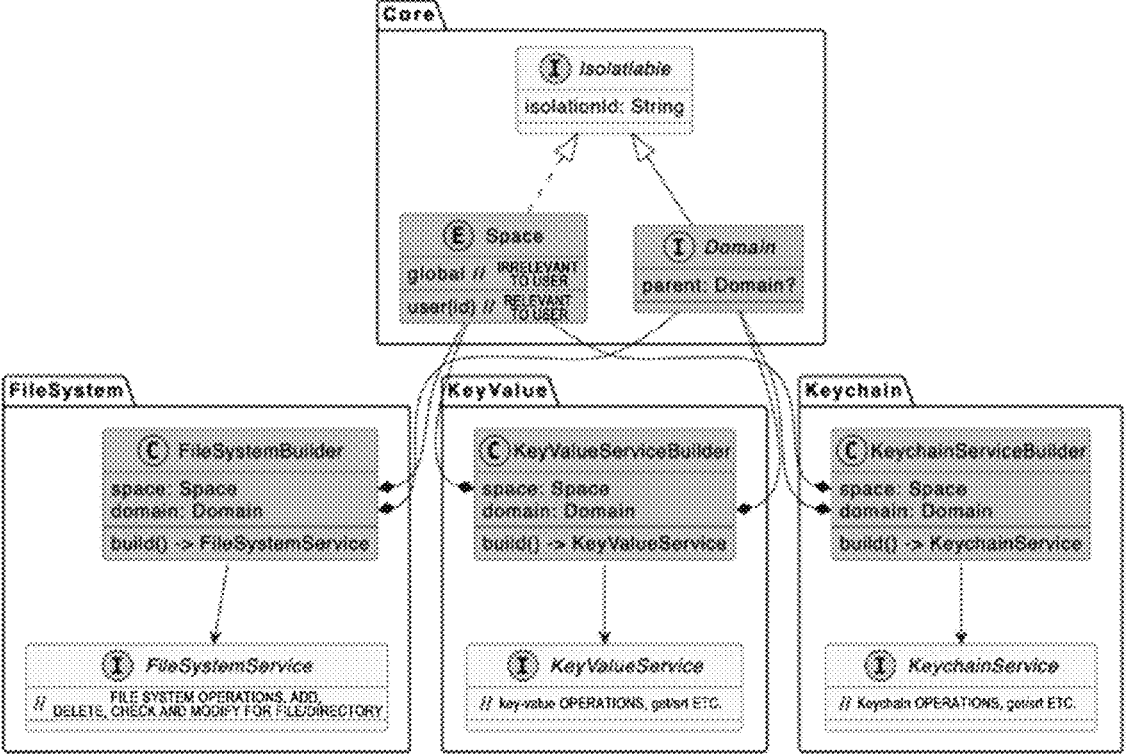
FIG. 2 shows a schematic flow chart of an exemplary method provided by embodiments of the present disclosure.

In order to make the object, technical solutions and advantages of the present disclosure clearer, the present disclosure will be further described in detail below with reference to specific embodiments and the accompanying drawings.

It should be noted that, unless otherwise defined, the technical terms or scientific terms used in the embodiments of this disclosure should have the usual meanings understood by those with ordinary skills in the field to which this disclosure belongs. The words such as "First", "second" used in embodiments of this disclosure do not indicate any order, quantity or importance, but are only used to distinguish different components. The words such as "include", "comprise" mean that the elements or things preceding such word include the elements or things listed after the word and their equivalents, without excluding other elements or things. The words such as "connect" or "link" are not limited to physical or mechanical connections, but may include electrical connections, whether direct or indirect. The words such as "up", "down", "left", "right" are only used to express relative positional relationships. When the absolute position of the described object changes, the relative positional relationship may also change accordingly.

As BACKGROUND mentioned, the current application software often integrates a plurality of components, all related to storage. The interfaces of these components are scattered, lack unified specifications and functional abstractions, and are difficult to control. Some components are designed for business isolation, some components are designed for user isolation, and some components are simply encapsulated for ease of use. During storage, a simple interface will be selected for storage operations based on the context, which will lead to problems such as crossed-data user, crossed-data business, and asymmetry in encryption and decryption.

Among them, crossed-data user may appear in the situation when switching users, such as switching from user A to user B, the data stored by user A may be accessed by user B, leading to functional abnormalities and data leakage.

Crossed-data business may appear in the situation in which some businesses are stored based on their names, the names of different businesses may the same, for example, business A and business B have the same name, thus the data of business A may be overwritten or accessed by business B, leading to functional abnormalities.

In view of this, in order to solve the above problems, the present disclosure provides a method for processing data. As shown in FIG. 1, the method includes:

Step S101: obtaining a storage request for target data.

In some embodiments, the method is applied to mobile terminals, which refer to mobile Internet terminals, that is, terminal devices that access the Internet through network technology. The mobile terminal usually includes a plurality of service components. Each service component may generate corresponding data, i.e., target data, when providing services to users of the mobile terminal. Based on the storage request for these target data, the mobile terminal stores the target data into the storage space to facilitate subsequent reading and use of the target data.

In this embodiment, a first interface is added, through which a storage request for target data sent by at least one service component of various service components on the mobile terminal is received, thereby the storage request for target data is obtained. Among them, the first interface includes corresponding interfaces and implementations.

Step S103: obtaining first dimension information and second dimension information of the target data based on the storage request, the first dimension information representing information of a user to which the target data belongs, and the second dimension information representing information of a business to which the target data belongs.

In this embodiment, after obtaining the storage request for the target data, the storage request can be parsed to obtain the first dimension information and the second dimension information of the target data.

The first dimension information is the isolation element, space, of the user dimension, which is used to represent the information of the user to which the target data belongs. The first dimension information includes a space corresponding to the user ID of each user, and also includes a global space, global, that does not belong to any user.

The second dimension information is the isolation element, domain, of the business dimension, which is used to represent the information of the business to which the target data belongs. The business to which the target data belongs can include an application, such as instant messaging (IM), email, calendar, etc.; it can also include a function (e.g., Settings), such as chat function, picture function, etc.

For example, various target data of user A in the instant messaging application may be stored in the first storage unit; or the image processing function in various applications may be abstracted and processed as an image function, and the target data of user B obtained by the image function may be stored in the first storage unit, and this embodiment is not limited thereto.

Step S105: determining a first storage region in a storage space based on the first and second dimension information.

In this embodiment, the obtained target data needs to be stored in the storage space. The storage space may refer to media such as disks used for data storage. In this step, a first storage region associated with both the first dimension information and the second dimension information is determined in the storage space based on the obtained first dimension information and second dimension information, and then the target data is stored in the first storage region.

The first storage region is determined based on the first dimension information and the second dimension information. In other words, the first storage region is determined based on both the user and business to which the target data belongs. That is, the first storage region is operated based on the corresponding user and business. Thus, the first storage region is isolated from other storage regions in the storage space based on the corresponding user and business. In this way, the storage operation for the first storage region is performed in the isolated disk, so that the problems of crossed-data users and crossed-data business may be solved.

Step S107: storing the target data into the first storage region.

The method for processing data described in this embodiment determines the first storage region from the storage space based on the first dimension information and the second dimension information of the target data. That is, the first storage region is determined based on both the user and the business to which the target data belongs. The target data is stored into the first storage region, which is performed independently and is implemented in the first storage region isolated from other storage regions. Therefore, the isolation of data storage is assured, and the problems of crossed-data users and crossed-data business are solved.

In some embodiments, before determining the first storage region in the storage space in step S105, the method further includes: determining a storage type of the target data according to the storage request; and determining the storage space corresponding to the storage type based on the storage type.

The storage type of the target data may include at least one of file (FileSystem) storage, key-value (KV) storage, keychain storage and other storage types. Data of the corresponding storage type needs to be stored in the same type of storage space. Therefore, after determining the storage type of the target data, it is necessary to determine the storage space corresponding to the storage type of the target data, and then determine the first storage region in the storage space. Finally, the target data is stored in the first storage region corresponding to the storage type of the target data.

In some embodiments, after determining the first storage region in the storage space in step S105, the method further includes: constructing index information for the first storage region based on the first dimension information and the second dimension information.

In this embodiment, the index information is constructed for the first storage region based on the first dimension information and the second dimension information. That is, the index information is constructed based on the user and business to which the target data belongs, and the first storage region is also related to the user and business to which the target data belongs. Therefore, the index information is also associated with the first storage region and is not associated with other storage regions in the storage space except the first storage region. This can ensure that individual storage region in the internal implementation of the storage service is completely isolated, and the index information associated with individual storage region is also completely isolated. Therefore, when the storage region is processed to store data based on the index information, the data processing is also completely isolated, thereby ensuring the isolation of data storage, and solving the problems of crossed-data users and crossed-data business.

In the related technologies, the string-based file path transfer causes module B unable to perceive the file writing details of module A. Thus, when module A writes files with encryption, module B fails to read, resulting in functional abnormalities. In this embodiment, the index information of the first storage region is constructed based on the first dimension information and the second dimension information, that is, the storage path of the target data is determined based on the user and business to which the target data belongs. Therefore, when the file path needs to be passed among modules, for example, module A passes the file path to module B after writing the file, and module B reads the file, the storage path of the target data is determined based on the user and business to which the target data belongs, and the first storage region of the target data is determined based on the user and business to which the target data belongs. This application can ensure that each module can obtain the stored target data from the first storage region according to the index information. In some embodiments, before constructing index information for the first storage region based on the first dimensional information and the second dimensional information, the method further includes:

Step S201: obtaining a storage service that matches the storage type of the target data, wherein the storage type includes at least one of a file storage, a key-value storage, or a keychain storage.

The storage type of the target data may include at least one of file (FileSystem) storage, key-value (KV) storage, key-chain storage, and other storage types. When the storage type of the target data is file storage, the corresponding storage service is FileSystemService; when the storage type of the target data is key-value storage, the corresponding storage service is KeyValue Service; when the storage type of the target data is keychain storage, the corresponding storage service is Keychain Service.

Step S203: constructing storage service instances corresponding to the first dimension information and the second dimension information based on the first dimension information, the second dimension information and the storage service.

As shown in FIG. 2, in this embodiment, corresponding storage services are obtained for various types of storage, including file storage services, key-value storage services, keychain storage services, etc. The storage service instance must be constructed based on the first dimension information and the second dimension information.

In this embodiment, when the storage service is file storage service, a file storage service instance is constructed based on the first dimension information, the second dimension information and the file storage service. The file storage service instance is associated with the first dimension information and the second dimension information. That is, the file storage service instance is associated with both the user and the business to which the target data belongs. When the target data is a file, the file or directory may be added through the file storage service instance so as to store the file. When the storage service is a key-value storage service, a key-value storage service instance is constructed based on the first dimension information, the second dimension information and the key-value storage service. The key-value storage service instance is associated with the first dimension information and the second dimension information. That is, the key-value storage service instance is associated with both the user and the business to which the target data belongs. When the target data is a key-value pair, the key-value pair may be written through the key-value storage service instance, thereby realizing the storage of the key-value pair.

When the storage service is a keychain storage service, a keychain storage service instance is constructed based on the first dimension information, the second dimension information and the keychain storage service. The keychain storage service instance is associated with the first dimension information and the second dimension information. That is, the keychain storage service instance is associated with both the user and the business to which the target data belongs. When the target data is a keychain, the keychain may be written through the keychain storage service instance, thereby realizing the storage of the keychain.

The storage service is not limited to the above embodiments, and may also include other types of storage services. The corresponding storage service instances are not limited to the above embodiments. Any storage service instance that meets the requirements of the above embodiments is within the scope of protection of this embodiment, and not be repeated in this embodiment.

In some embodiments, when the storage type includes file storage, the storage service instance includes a file storage service instance; constructing index information for the first storage region based on the first dimension information and the second dimension information includes:

Step S301: calling the file storage service instance to parse generated path based on the first dimension information and the second dimension information.

Step S303: adding a relative path for the first storage region as the index information of the first storage region based on the generated path.

Figure 3:
FIG. 3 shows a schematic flowchart of an exemplary method provided by embodiments of the present disclosure.

As shown in FIG. 3, in this embodiment, when the storage type of the target data is file storage, the index information of the first storage region is the storage path of the first storage region. At this time, the file storage service instance may be called, and the generated path may be parsed based on the first dimension information and the second dimension information, and then a relative path may be added to the first storage region as index information of the first storage region based on the generated path.

In this case, storing the target data into the first storage region in Step S107 includes: calling the file storage service instance to store the target data into the first storage region according to the relative path.

In this embodiment, after determining the storage path, i.e., relative path, of the first storage region, the file storage service instance corresponding to the target data may be calling, and the content of the target data may be stored in the first storage region according to the relative path, thus completing the storage of target data.

In some embodiments, when the storage type includes key-value storage, and the storage service instance includes a key-value storage service instance; constructing index information for the first storage region based on the first dimension information and the second dimension information includes:

calling the key-value storage service instance, remapping the keywords of the target data based on the first dimension information and the second dimension information, and making the mapped keywords as the index information of the first storage region.

Figure 4:
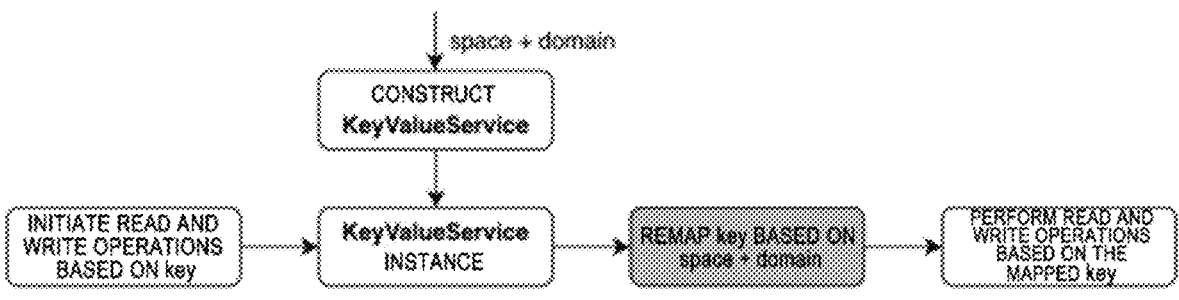
FIG. 4 shows a schematic flowchart of an exemplary method provided by embodiments of the present disclosure.

As shown in FIG. 4, in this embodiment, when the storage type of the target data is key-value storage, the index information of the first storage region is the keyword of the first storage region. At this time, the key-value storage service instance may be called and the keywords of the target data may be remapped based on the first dimension information and the second dimension information, and the mapped keywords may be used as the index information of the first storage region.

In this case, storing the target data into the first storage region in step S107 includes: calling the key-value storage service instance to store the content of the target data corresponding to the keyword into the first storage region.

In this embodiment, after the storage path, i.e., the keyword, of the first storage region is determined, the key-value storage service instance corresponding to the target data may be called, and the content of the target data corresponding to the keyword may be stored into the first storage region according to the keyword, thus completing the storage of the target data.

In some embodiments, when the storage type includes keychain storage, and the storage service instance includes a keychain storage service instance; constructing index information for the first storage region based on the first dimension information and the second dimension information includes:

calling the keychain storage service instance, remapping the keywords of the target data based on the first dimension information and the second dimension information, and making the mapped keywords as the index information of the first storage region.

In this embodiment, when the storage type of the target data is keychain storage, the index information of the first storage region is the keyword of the first storage region. At this time, the keychain storage service instance may be called and the keywords of the target data may be remapped based on the first dimension information and the second dimension information, and the mapped keywords may be used as the index information of the first storage region.

In this case, storing the target data into the first storage region in step S107 includes: calling the keychain storage service instance to store the content of the target data corresponding to the keyword into the first storage region.

In this embodiment, after the storage path, i.e., the keyword, of the first storage region is determined, the keychain storage service instance corresponding to the target data may be called, and the content of the target data corresponding to the keyword may be stored into the first storage region according to the keyword, thus completing the storage of the target data.

In some embodiments, the method further includes:

Step S401: obtaining a processing request for the target data.

In this embodiment, after the target data is stored into the first storage region, the processing request for the target data may be responded to based on the target data stored in the first storage region. The processing request includes at least one request for deleting, modifying and querying the target data.

Step S403: obtaining the first dimension information and the second dimension information of the target data according to the processing request.

In order to respond to the processing request for the target data, it is also necessary to firstly obtain the first dimension information and the second dimension information of the target data, where the first dimension information is used to represent the information of the user to which the target data belongs, and the second dimension information is used to represent the information of the business to which the target data belongs.

Step S405: determine the first storage region based on the first dimension information and the second dimension information.

Since individual storage region in the storage space is associated with the first dimension information and the second dimension information, after obtaining the first dimension information and the second dimension information for the target data, the storage region, such as the first storage region, of the target data may be located according to the first dimension information and the second dimension information.

Step S407: responding to the processing request based on the first storage region.

Finally, the processing request for the target data may be responded to based on the first storage region. Specifically, at least one of operations such as deletion, modification, and query of the target data may be performed based on the first storage region, and this embodiment is not limited thereto.

In this embodiment, after obtaining the first dimension information and the second dimension information, the storage service instance associated with the target data may be called to respond to the processing request. For example, the files or directories may be added, deleted, modified and queried by calling a file storage service instance, the key-value pair may be read and written by calling a key-value storage service instance, and the keychain may be read and written by calling a keychain storage service instance, and the like, this embodiment is not limited thereto.

If the processing request is a deleting operation, the storage service instance may be deleted and the corresponding space may be released after all the data corresponding to the storage service instance in the storage region are deleted, thereby the space occupation may be reduced. The storage service instance may be maintained if necessary, and this embodiment is not limited thereto.

In some embodiments, the storage request sent by at least one service component among a plurality of service components is received by the first interface, thereby the storage request for the target data is obtained, thus ensuring that the code that relies on each repository relies on the interface of the unified repository.

The method for processing data described in the disclosed embodiments realizes the isolated storage and processing of the target data based on the information of the user and the business to which the target data belongs, ensuring that the processing of the target data is completed in an isolated storage space, without worrying about the problem such as crossed-data user or crossed-data business. Meanwhile, the index information of the target data to the first storage region is determined based on the information of the user and the business to which the target data belongs, thus index of data may be controlled in convergence manner. In this way, all the index information is associated with the user and business to which the target data belongs, but not to the user and business to which other data belongs. Therefore, the data indexes of data to be stored with different requirements may be completely isolated.

In this case, when the user data is encrypted after being stored on the disk, the problems of being difficult to cover the entire link due to scattered interfaces, and of asymmetry in encryption and decryption due to point-by-point advancement can be solved. The data stored through the first interface is uniformly encrypted. Moreover, the data stored through the first interface may also be uniformly decrypted when the data is read out. The problem that how to decrypt the data when read may be not considered, thereby solving the problem of asymmetry in encryption and decryption.

When the data of the user's designated account needs to be remotely erased, since the data is stored uniformly through the first interface and is stored based on the user and business to which the data belongs, all the related data can be directly located based on the user and business to which the data belongs. The problem of incomplete reproducibility of data due to scattered interfaces and lack of convergence, and incomplete coverage caused by point-by-point advancement may be avoided.

In this embodiment, a set of abstract and scalable storage services are implemented on the existing operating system storage interface of the mobile terminal, which may filter, intercept, modify all the storage operations without intrusion. The user and the business to which the data belongs are abstracted as isolation elements. When constructing a storage service instance, the user and business to which the data belongs must be determined to ensure that the disk operations of different users and different businesses are based on independent instances, and the data is stored in separated storage regions. The isolation of storage is ensured from the root and the problem of crossed-data is avoided. With strictly-controlled usage of storage interfaces, all storage services are converged with normalization, and technical support are provided for compass storage, remote erasure, etc.

It should be noted that the method of the embodiments of present disclosure can be executed by a single device, such as a computer or server. The method of present embodiments can also be applied in distributed scenarios and is completed by a plurality of devices cooperating with each other. In this distributed scenario, one of the plurality of devices may only execute one or more steps in the method of the disclosed embodiments, and the plurality of devices will interact with each other to complete the described methods.

It should be noted that some embodiments of the present disclosure have been described above. Other embodiments are within the scope of the attached claims. In some cases, the actions or steps recited in claims may be performed in a different order than in the above embodiments and still achieve the desired results. Additionally, the processes depicted in the figures do not necessarily require the specific order shown, or sequential order, to achieve desirable results. Multitasking and parallel processing are also possible or may be advantageous in certain implementations.

Based on the same inventive concept, corresponding to any of the methods of above embodiments, The present disclosure further provides an apparatus for data processing.

Figure 5:
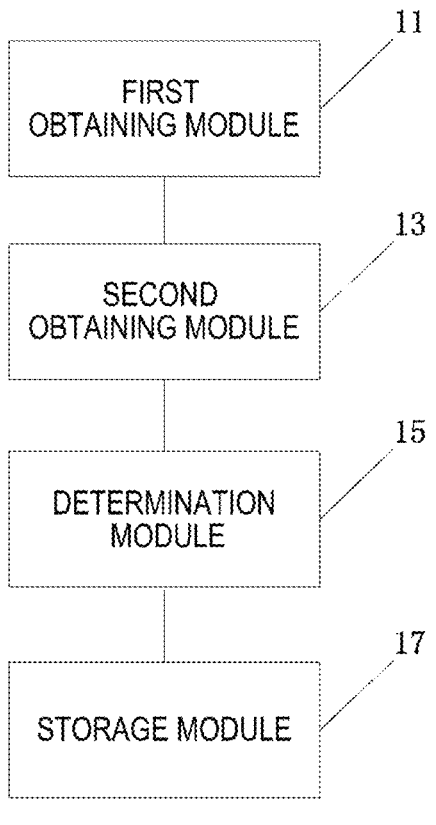
FIG. 5 shows a schematic diagram of an exemplary apparatus provided by embodiments of the present disclosure.

Referring to FIG. 5, the apparatus includes:

a first obtaining module 11 configured to obtain storage requests for target data.

a second obtaining module 13 configured to obtain first dimension information and second dimension information of the target data based on the storage request, the first dimension information represents information of a user to which the target data belongs, and the second dimension information represents information of a business to which the target data belongs.

a determination module 15 configured to determine a first storage region in the storage space based on the first and second dimension information.

a storage module 17 configured to: store the target data into the first storage region.

In some embodiments, the data processing apparatus is further configured to: determine the storage type of the target data according to the storage request; and determine the storage space corresponding to the storage type based on the storage type.

In some embodiments, the data processing apparatus is further configured to: construct index information for the first storage region based on the first dimensional information and the second dimensional information.

In some embodiments, the data processing apparatus is further configured to: obtain a storage service that matches the storage type of the target data, and the storage type includes at least one of a file storage, a key-value storage, or a keychain storage; and construct a storage service instance corresponding to the first dimension information and the second dimension information based on the first dimension information, the second dimension information and the storage service.

In some embodiments, the storage type includes the file storage, and the storage service instance includes a file storage service instance; the data processing apparatus is further configured to: call the file storage service instance to parse a generated path based on the first and second dimension information; and adding a relative path for the first storage region as the index information of the first storage region based on the generated path.

In some embodiments, the storage module 17 is further configured to call the file storage service instance and store the target data in the first storage region based on the relative path.

In some embodiments, the storage type includes the key-value storage or the keychain storage, and the storage service instance includes a key-value storage service instance or a keychain storage service instance; the data processing apparatus is further configured to: call the key-value storage service instance or the keychain storage service instance to remap a keyword of the target data based on the first and second dimension information, and determine the mapped keyword as the index information of the first storage region.

In some embodiments, the storage module 17 is further configured to: call the key-value storage service instance or the keychain storage service instance to store the content of the target data corresponding to the keyword into the first storage region.

In some embodiments, the storage module 17 is further configured to: obtain a processing request for the target data; obtain t the first and second dimension information of the target data based on the processing request; determine the first storage region based on the first and second dimension information; and respond to the processing request based on the first storage region.

In some embodiments, the processing request includes at least one request for deletion, modification, and query of the target data; the responding to the storage service request includes: performing at least one operation of deleting, modifying or querying the target data based on the first storage region.

In some embodiments, the first obtaining module 11 is further configured to: receive the storage request sent by at least one service component among a plurality of service components via a first interface.

For the convenience of description, the apparatus is divided into various modules according to functions when described. Of course, the functions of each module may be implemented in the same one or a plurality of software and/or hardware when implementing the present disclosure.

The apparatus of the above embodiments is used to implement the corresponding method for processing data in any of the foregoing embodiments, and has the beneficial effects of the corresponding method embodiments, which will not be repeated here.

Based on the same inventive concept, corresponding to any of the method embodiments mentioned above, the present disclosure further provides an electronic device, including a memory, a processor, and a computer program stored in the memory and executed on the processor. The program when executed by the processor, implements the method for processing data of any of the above embodiments.

Figure 6:
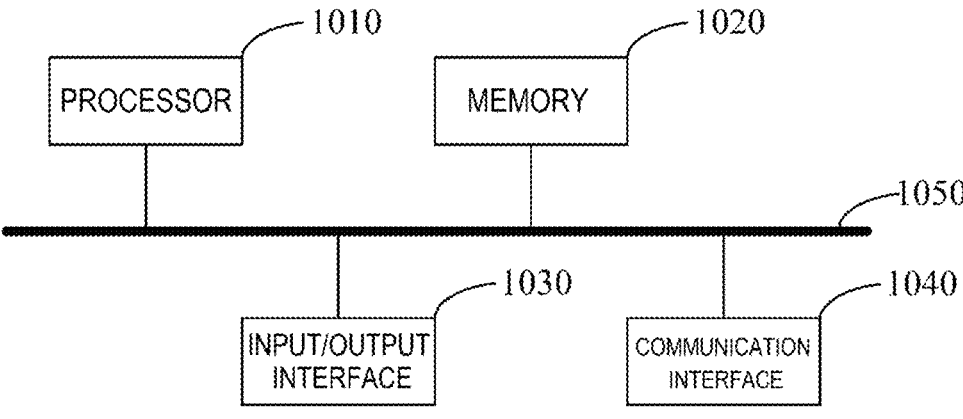
FIG. 6 shows a schematic diagram of the hardware structure of an exemplary computer device provided by embodiments of the present disclosure.

FIG. 6 shows a more specific hardware structure diagram of the electronic device provided by present embodiments. The device may include: a processor 1010, a memory 1020, an input/output interface 1030, a communication interface 1040 and a bus 1050. The processor 1010, the memory 1020, the input/output interface 1030 and the communication interface 1040 implement communication connections among each other within the device through the bus 1050.

The processor 1010 may be implemented by a general CPU (central processing unit), a microprocessor, an application specific integrated circuit (ASIC), or one or more integrated circuits, and is used to execute related program to implement the technical solutions provided by the embodiments of this application.

The memory 1020 may be implemented in the form of ROM (read only memory), RAM (random access memory), static storage device, dynamic storage device, etc. The memory 1020 may store operating systems and other application programs. When the technical solutions provided by embodiments in this specification are implemented through software or firmware, the relevant program codes are stored in the memory 1020 and called and executed by the processor 1010.

The input/output interface 1030 is used to connect the input/output module to realize information input and output. The input/output module may be configured in the device as a component (not shown in the figure), or may be externally connected to the device to provide corresponding functions. Input devices may include keyboards, mouse, touch screens, microphones, various sensors, etc., and output devices may include monitors, speakers, vibrators, indicator lights, etc.

The communication interface 1040 is used to connect a communication module (not shown in the figure) to realize communication interaction between this device and other devices. The communication module may communicate via wired ways (such as USB, network cable, etc.) or wireless ways (such as mobile network, WIFI, Bluetooth, etc.).

The bus 1050 includes a passage that transfers information among various components (e.g., processor 1010, memory 1020, input/output interface 1030 and communication interface 1040) of the device.

It should be noted that although only the processor 1010, the memory 1020, the input/output interface 1030, the communication interface 1040 and the bus 1050 are shown in the device, the device may further include other components required for normal operation during specific implementation. In addition, those skilled in the art may understand that the above-mentioned device may only include the components necessary to implement the embodiments in this specification, and does not necessarily include all the components shown in the drawings.

The electronic device of the above embodiments is used to implement the corresponding method for processing data in any of the foregoing embodiments, and has the beneficial effects of the corresponding method embodiments, which will not be repeated here.

Based on the same inventive concept, corresponding to any of the above embodiments methods, The present disclosure further provides a non-transitory computer-readable storage medium storing computer instructions, the computer instructions are used to cause the computer to execute the method for processing data of any one of the above embodiments.

Computer-readable media of present embodiments include persistent and non-transitory, removable and non-removable media that may be implemented by any method or technology for information storage. Information may be computer-readable instructions, data structures, modules of programs, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disc read-only memory (CD-ROM), digital versatile disc (DVD) or other optical storage, magnetic tape cassettes, tape magnetic disk storage or other magnetic storage devices or any other non-transmission medium for storing information that can be accessed by a computing device.

The computer instructions stored in the storage medium of the above embodiments are used to cause the computer to execute the method for processing data described in any of the above embodiments, and have the beneficial effects of the corresponding method embodiments, which will not be repeated here.

Based on the same inventive concept, corresponding to any of the embodiment methods mentioned above, the present disclosure further provides a computer program product, which includes a computer program. In some embodiments, the computer program is executable by one or more processors such that the processors perform the method for processing data. Corresponding to the execution subject corresponding to each step in each embodiment of the method, the processor that executes the corresponding step may belong to the corresponding execution subject.

The computer program product of the above embodiments is used to cause the processor to execute the method for processing data described in any of the above embodiments, and has the beneficial effects of the corresponding method embodiments, which will not be repeated here.

Those of ordinary skill in the art should understand that the above discussion of any embodiments is only illustrative, and is not intended to imply that the scope of the present disclosure (including claims) is limited to these examples. With the spirit of the present disclosure, the technical features of above embodiments or different embodiments may be combined, the steps may be implemented in any order, and there are many other variations of different aspects of the disclosed embodiments as described above, which are not provided in detail for the sake of brevity.

Additionally, to simplify illustration and discussion, and so as not to obscure the embodiments of the present disclosure, well-known power/ground connections to integrated circuit (IC) chips and other components may or may not be shown in the figures. Furthermore, apparatus may be shown in block diagram in order to avoid obscuring the disclosed embodiments, and this also takes into account the fact that the details regarding the implementation of these block diagram devices are highly dependent on the platform on which the disclosed embodiments are to be implemented (i.e., these details should be well within the understanding of those skilled in the art). Where specific details (e.g., circuits) are set forth to describe exemplary embodiments of the present disclosure, it will be apparent to one skilled in the art that the embodiments of this disclosure may be practiced without or with variations in these specific details. Accordingly, these descriptions should be considered illustrative rather than restrictive.

Although the present disclosure has been described in conjunction with specific embodiments thereof, many substitutions, modifications and variations of these embodiments will be apparent to those of ordinary skill in the art from the foregoing description. For example, other memory architectures (e.g., dynamic RAM (DRAM)) may use the embodiments discussed.

The disclosed embodiments are intended to cover all alternatives, modifications and variations that fall within the broad scope of the appended claims. Therefore, any omissions, modifications, equivalent substitutions, improvements, and the like made within the spirit and principles of the embodiments of this disclosure shall be included in the protection scope of this disclosure.

We claim:

1. A method for data processing, comprising:
   obtaining, at an electronic device, a storage request for target data;
   obtaining, by the electronic device, first dimension information and second dimension information of the target data based on the storage request, the first dimension information representing information of a user to which the target data belongs, and the second dimension information representing information of a business to which the target data belongs;
   determining, by the electronic device, a first storage region in a storage space based on the first dimension information and second dimension information;
   storing, by the electronic device, the target data into the first storage region; and
   constructing, by the electronic device, index information for the first storage region based on the first dimension information and second dimension information, wherein obtaining the target data from the first storage region is based on the index information,
   wherein before constructing index information for the first storage region based on the first dimension information and second dimension information, the method further comprises:
   obtaining a storage service that matches a storage type of the target data, wherein the storage type comprises at least one of: a file storage, a key-value storage or a keychain storage; and
   constructing a storage service instance corresponding to the first dimension information and second dimension information based on the first dimension information, the second dimension information and the storage service,
   wherein the storage type comprises a file storage, and the storage service instance comprises a file storage service instance, and
   wherein constructing index information for the first storage region based on the first dimension information and second dimension information comprises:
   calling the file storage service instance to parse a generated path based on the first dimension information and second dimension information; and
   adding a relative path for the first storage region as the index information of the first storage region based on the generated path.

2. The method of claim 1, wherein before determining the first storage region in the storage space, the method further comprises:
   determining a storage type of the target data based on the storage request; and
   determining the storage space corresponding to the storage type based on the storage type.

3. The method of claim 1, wherein the first storage region is isolated from a second storage region in the storage space, further index information constructed for the second storage region being different from the index information for the first storage region.

4. The method of claim 1, wherein storing the target data into the first storage region comprises:
   calling the file storage service instance to store the target data into the first storage region based on the relative path.

5. The method of claim 1, wherein the storage type includes a key-value storage or a keychain storage, and the storage service instance comprises a key-value storage service instance or a keychain storage service instance, and
   wherein constructing index information for the first storage region based on the first dimension information and second dimension information comprises:
   calling the key-value storage service instance or the keychain storage service instance to remap a keyword of the target data based on the first dimension information and second dimension information, and determining the mapped keyword as the index information of the first storage region.

6. The method of claim 5, wherein storing the target data into the first storage region comprises:
   calling the key-value storage service instance or the keychain storage service instance to store content of the target data corresponding to the keyword into the first storage region.

7. The method of claim 1, further comprising:
   obtaining, at the electronic device, a processing request for the target data;
   obtaining the first dimension information and second dimension information of the target data based on the processing request;
   determining the first storage region based on the first dimension information and second dimension information; and
   responding to the processing request based on the first storage region.

8. The method of claim 7, wherein the processing request comprises at least one request for deleting, modifying or querying the target data, and
   wherein determining the first storage region comprises:

determining the index information based on the first dimension information and second dimension information; and determining the first storage region based on the index information, wherein responding to the processing request comprises:

performing at least one operation of deleting, modifying or querying the target data based on the first storage region.

9. The method of claim 1, wherein obtaining storage request for target data comprises:

receiving the storage request sent by at least one service component among a plurality of service components via a first interface of the electronic device.

10. An electronic device, comprising a memory, a processor and a computer program stored in the memory and executable on the processor, wherein the program when executed by the processor, implements a method comprising:

obtaining a storage request for target data;

obtaining first dimension information and second dimension information of the target data based on the storage request, the first dimension information representing information of a user to which the target data belongs, and the second dimension information representing information of a business to which the target data belongs;

determining a first storage region in a storage space based on the first dimension information and second dimension information;

storing the target data into the first storage region; and constructing index information for the first storage region based on the first dimension information and second dimension information, wherein obtaining the target data from the first storage region is based on the index information, wherein before constructing index information for the first storage region based on the first dimension information and second dimension information, the method further comprises:

obtaining a storage service that matches a storage type of the target data, wherein the storage type comprises at least one of: a file storage, a key-value storage or a keychain storage; and constructing a storage service instance corresponding to the first dimension information and second dimension information based on the first dimension information, the second dimension information and the storage service, wherein the storage type comprises a file storage, and the storage service instance comprises a file storage service instance, and wherein constructing index information for the first storage region based on the first dimension information and second dimension information comprises:

calling the file storage service instance to parse a generated path based on the first dimension information and second dimension information; and adding a relative path for the first storage region as the index information of the first storage region based on the generated path.

11. The electronic device of claim 10, wherein before determining the first storage region in the storage space, the method further comprises:

determining a storage type of the target data based on the storage request; and determining the storage space corresponding to the storage type based on the storage type.

12. The electronic device of claim 10, wherein the first storage region is isolated from a second storage region in the storage space, further index information constructed for the second storage region being different from the index information for the first storage region.

13. The electronic device of claim 10, wherein storing the target data into the first storage region comprises:

calling the file storage service instance to store the target data into the first storage region based on the relative path.

14. The electronic device of claim 10, wherein the storage type includes a key-value storage or a keychain storage, and the storage service instance comprises a key-value storage service instance or a keychain storage service instance, and wherein constructing index information for the first storage region based on the first dimension information and second dimension information comprises:

calling the key-value storage service instance or the keychain storage service instance to remap a keyword of the target data based on the first dimension information and second dimension information, and determining the mapped keyword as the index information of the first storage region.

15. The electronic device of claim 10, wherein the method further comprises:

obtaining a processing request for the target data;

obtaining the first dimension information and second dimension information of the target data based on the processing request;

determining the first storage region based on the first dimension information and second dimension information; and responding to the processing request based on the first storage region.

16. A non-transitory computer-readable storage medium storing computer instructions, wherein the computer instructions are used to cause the computer to execute a method comprising:

obtaining a storage request for target data;

obtaining first dimension information and second dimension information of the target data based on the storage request, the first dimension information representing information of a user to which the target data belongs, and the second dimension information representing information of a business to which the target data belongs;

determining a first storage region in a storage space based on the first dimension information and second dimension information; and storing the target data into the first storage region; and constructing index information for the first storage region based on the first dimension information and second dimension information, wherein obtaining the target data from the first storage region is based on the index information, wherein before constructing index information for the first storage region based on the first dimension information and second dimension information, the method further comprises:

obtaining a storage service that matches a storage type of the target data, wherein the storage type comprises at least one of: a file storage, a key-value storage or a keychain storage; and constructing a storage service instance corresponding to the first dimension information and second dimension information based on the first dimension information, the second dimension information and the storage service, wherein the storage type comprises a file storage, and the storage service instance comprises a file storage service instance, and wherein constructing index information for the first storage region based on the first dimension information and second dimension information comprises:

calling the file storage service instance to parse a generated path based on the first dimension information and second dimension information; and adding a relative path for the first storage region as the index information of the first storage region based on the generated path.

* * * * *